May 22, 1951 M. M. GECI, JR 2,553,650
ELECTRIC CIRCUIT CONTROL WITH SHEET METAL SHAFT
Filed Sept. 6, 1950 2 Sheets-Sheet 1

INVENTOR
Melan Max Geci, Jr.
BY
Brown, Critchlow, Flick & Peckham
his ATTORNEYS

May 22, 1951  M. M. GECI, JR  2,553,650
ELECTRIC CIRCUIT CONTROL WITH SHEET METAL SHAFT
Filed Sept. 6, 1950  2 Sheets-Sheet 2

INVENTOR.
Melan Max Geci, Jr.
BY
Brown, Critchlow, Flick & Peckham
his ATTORNEYS Patented May 22, 1951

2,553,650

UNITED STATES PATENT OFFICE 2,553,650

ELECTRIC CIRCUIT CONTROL WITH SHEET METAL SHAFT

Melan Max Geci, Jr., St. Marys, Pa., assignor to Stackpole Carbon Company, St. Marys, Pa., a corporation of Pennsylvania Application September 6, 1950, Serial No. 183,446

8 Claims. (Cl. 201—48)

1

This invention relates to manually operable electric circuit controls for use in radio and television sets and the like, and more particularly to the construction of the control shafts therein.

Heretofore, electric circuit controls of this type, such as switches and volume controls, have been provided with solid rotatable shafts on which the control knobs have been mounted. These solid shafts are a relatively expensive part of the controls, and in television circuits where certain volume controls are adjusted only once or very infrequently, it is not necessary to have solid control shafts. Furthermore, solid shafts have required the use of bushings, generally threaded, which also are relatively expensive.

It is among the objects of this invention to provide an electric circuit control with a control shaft which is less expensive than the solid cylindrical shafts used heretofore, and which can be used either with or without a threaded bushing attached to the base member of the control.

In accordance with the invention an electric circuit control, such as a switch or potentiometer, includes supporting means provided with a vertical passage therethrough. The circuit-controlling means may be mounted on the supporting means. A rotatable shaft extends through the vertical passage to rotate a movable member that is mounted on its upper end. Unlike the solid control shafts used heretofore, this shaft is formed from a strip of sheet metal which has been folded to provide spaced vertical side portions that extend through the passage in the supporting means in engagement with the side wall of the passage. The lower ends of the side portions are integrally connected by a head portion which projects laterally from opposite edges of the side portions so that the shaft cannot move upward in the passage. If desired, the head may be provided with a slot in a plane perpendicular to the shaft axis for receiving a flat implement for turning the shaft. For the single or occasional adjustment to which such a control is subjected, a shaft formed in this manner is perfectly adequate.

Figure 1:
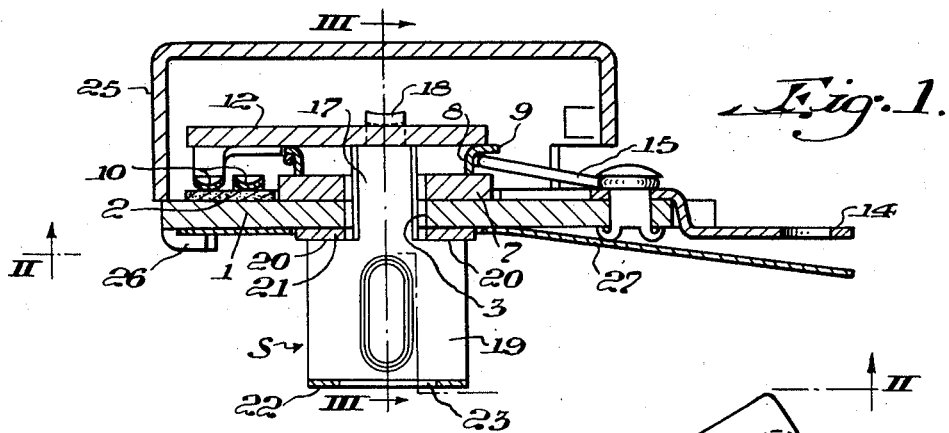
Figure 2:
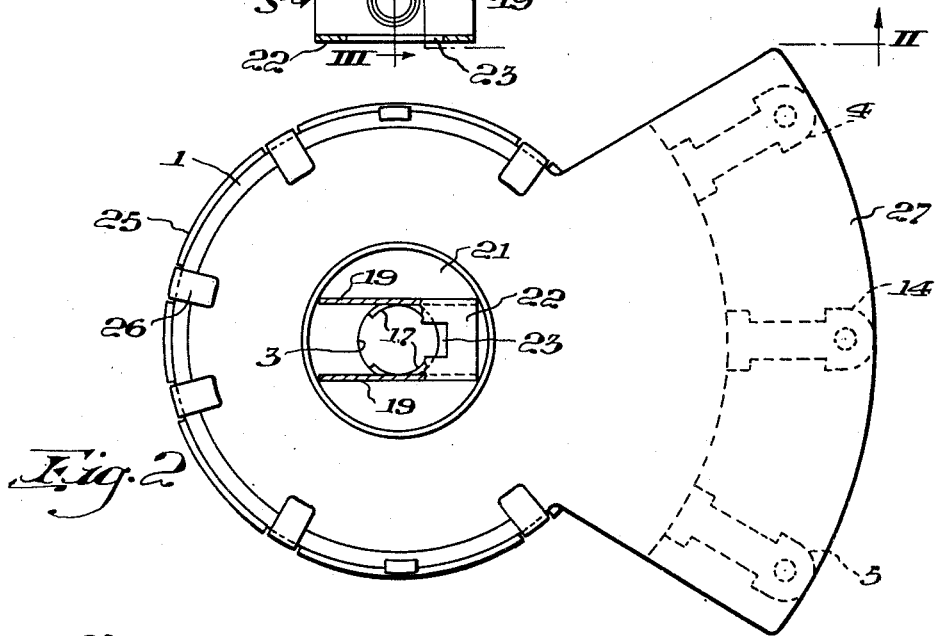
Figure 3:
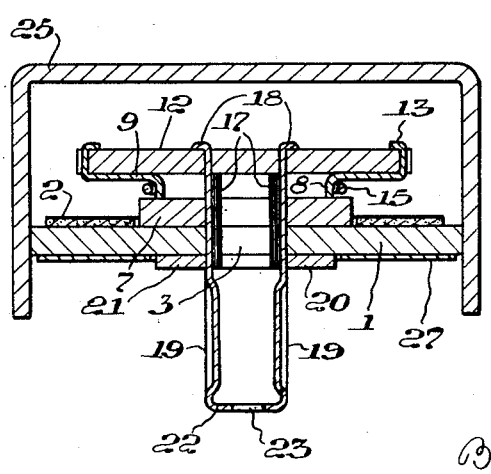
Figure 4:
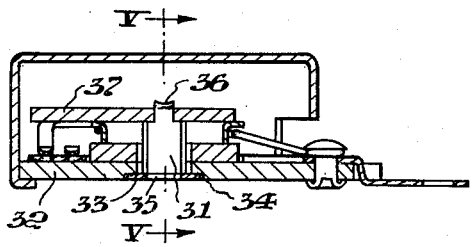
Figure 5:
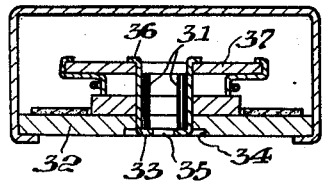
Figure 6:
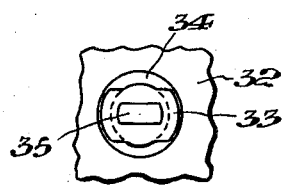

The invention is illustrated in the accompanying drawings in which Fig. 1 is a greatly enlarged vertical section throught a control; Fig. 2 is a bottom plan and section, taken on the line II—II of Fig. 1; Fig. 3 is a vertical section taken on the line III—III of Fig. 1; Fig. 4 is a view similar to Fig. 1, of a modification of the invention; Fig. 5 is a vertical section taken on the line V—V of Fig. 4; Fig. 6 is a fragmentary bottom view of the shaft shown in Figs. 4 and 5;

2

Figure 7:
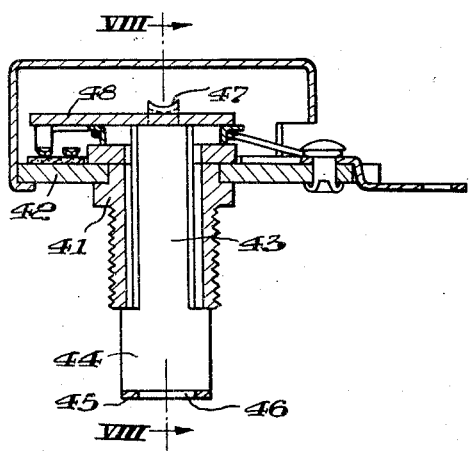
Figure 8:
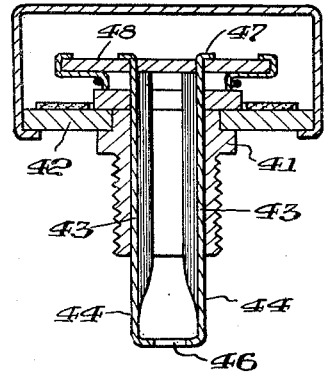

Fig. 7 is a view, similar to Figs. 1 and 4, of a further modification; and Fig. 8 is a vertical section taken on the line VIII—VIII of Fig. 7.

Referring to Figs. 1, 2 and 3 of the drawings, a volume control, especially suitable for television sets, is shown in a position in which its insulating base member 1 is horizontal and has a flat carbonaceous resistor element 2 on its upper surface. The resistor is curved around a central circular opening 3 extending vertically through the base member. The adjacent ends of the resistor are riveted to metal terminals 4 and 5 projecting laterally from the base.

A thin collar 7 of insulating material rests on the base around its central opening and is engaged by a hub 8 which has been struck down from a thin sheet metal head 9 that is provided with a large central opening. Projecting toward each other from opposite sides of the control head is a pair of spring contact fingers 10 having down-turned ends that engage and slide upon the resistor. On top of the head is an insulating member 12 which is provided at its opposite ends with notches, into which extend upturned lugs 13 (Fig. 3) at the opposite sides of the head. The control shaft S, by which the head is turned, has its upper end rigidly connected to the insulating member 12 so that the latter can be turned by the shaft. A third terminal 14, fastened to the base member between the other two terminals, is electrically connected to the metal contact head 9 by means of a spring wire 15. The outer end of the wire is riveted to the central terminal, and its inner end is formed into a loop that almost completely encircles the hub 8 of the control head.

It is a feature of this invention that the shaft S is formed from a strip of sheet metal which has been bent or folded in such a way that it forms spaced vertical side portions 17 which extend through collar 7 and opening 3 in the base, as well as through the hub 8 of the control head. The upper ends of these side portions are provided with integral lugs 18 that extend up through a pair of holes in the movable member 12, over which they are bent to lock that member and the shaft together. The side portions 17 of the folded shaft engage the side wall of the opening through the base to center the shaft in the opening. Preferably, as shown in Fig. 2, they are curved transversely to fit throughout their width against the wall of the opening so that the shaft can be turned easily. In this embodiment of the invention the lower ends of the vertical side portions 17 of the shaft have substantially parallel integral extensions 19 that project below the base member 1. These extensions are wider than side portions 17 and project laterally from the opposite edges of portions 17 to form horizontal shoulders 20 that engage the bottom of a metal washer 21 which spaces them from the lower surface of the base member. The lower ends of the parallel extensions 19 are integrally connected by a transverse portion 22 which is formed when the metal strip is folded to form the shaft. This last portion and the adjoining extensions form a head, which prevents the shaft from moving forward in the base and by which the shaft can be turned. It is desirable to provide the transverse portion of the head with a slot 23 for receiving a flat implement, such as a screw driver, so that the head can be turned in case it cannot be reached by the fingers.

Mounted on the base member 1 is the usual protective metal can 25 which has lugs 26 bent under the base to hold it in place. A sheet 27 of insulating material may be clamped between the lugs and the base, and extends out beneath the electric terminals to insulate them from a metal panel in case the control is mounted on such a panel.

Although this control has been described as if the head of shaft S were at the lower end of the shaft, it will be understood that the control may be mounted with the head projecting upward or laterally. This is also true of the following embodiments of the invention.

In the modification of the invention shown in Figs. 4, 5 and 6 the transversely curved vertical side portions 31 of the folded sheet metal shaft do not have any extensions below the base member 32. Instead, the head of the shaft is formed by the transverse portion 33 which integrally connects the lower ends of the side portions and projects laterally beyond their opposite edges. The laterally projecting ends of the transverse portion engage the lower surface of the base member, preferably in a countersink 34, to prevent the shaft from moving upward in the base member. The head of the shaft is provided with a longitudinal slot 35 for receiving a screw driver or the like for turning the shaft. The upper ends of the side portions 31 of the shaft have integral lugs 36 that extend up through a rotatable insulating member 37 and are bent over its upper surface to connect it to the shaft.

The modification shown in Figs. 7 and 8 is more conventional, in that a metal bushing 41 is rigidly mounted in the central opening in the base member 42. The bushing projects below the base and is threaded for receiving a nut (not shown) so that it can be attached to a control panel. The vertical side portions 43 of the folded sheet metal shaft extend through the bushing, in which they are curved transversely to fit against the wall of the bushing. These side portions have extensions 44 at their lower ends, which project laterally across the lower end of the bushing to some extent to keep the shaft from moving upward in the bushing. The lower ends of the extensions are integrally connected by a transverse portion 45 that may be provided with a tool-receiving slot 46. The extensions 44 and connecting slotted portion form a head for the shaft. The upper ends of side portions 43 are provided with integral lugs 47 that extend up through holes in a rotatable insulating member 48, over which they are bent to connect that member to the shaft.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An electric circuit control comprising supporting means provided with a vertical passage therethrough, circuit controlling means mounted on the supporting means, a rotatable shaft extending through said passage, and a movable member rigidly mounted on the upper end of the shaft for rotation thereby, said shaft being formed from a strip of sheet metal folded to provide spaced vertical side portions that extend through said passage in engagement with its side wall and that have their lower ends integrally connected by a head portion projecting laterally from opposite edges of the side portions so that the shaft cannot move upward.

2. An electric circuit control comprising supporting means provided with a vertical passage therethrough, circuit controlling means mounted on the supporting means, a rotatable shaft extending through said passage, and a movable member rigidly mounted on the upper end of the shaft for rotation thereby, said shaft being formed from a strip of sheet metal folded to provide spaced vertical side portions that extend through said passage in engagement with its side wall and that have their lower ends integrally connected by a head portion projecting laterally from the opposite edges of the side portions so that the shaft cannot move upward, the upper ends of said side portions being provided with lugs that extend up through said movable member and are bent laterally over the top of it.

3. An electric circuit control comprising supporting means provided with a vertical passage therethrough, circuit controlling means mounted on the supporting means, a rotatable shaft extending through said passage, and a movable member rigidly mounted on the upper end of the shaft for rotation thereby, said shaft being formed from a strip of sheet metal folded to provide spaced vertical side portions that extend through said passage in engagement with its side wall and that have their lower ends integrally connected by a head portion projecting laterally from the opposite edges of the side portions so that the shaft cannot move upward, the head being provided with a slot in a plane perpendicular to the shaft axis adapted to receive a flat implement for turning the shaft.

4. An electric circuit control comprising supporting means provided with a circular vertical passage therethrough, circuit controlling means mounted on the supporting means, a rotatable shaft extending through said passage, and a movable member rigidly mounted on the upper end of the shaft for rotation thereby, said shaft being formed from a strip of sheet metal folded to provide spaced vertical side portions that extend through said passage and are curved transversely to fit against its side wall, the lower ends of said side portions being integrally connected by a head portion projecting laterally from the opposite edges of the side portions so that the shaft cannot move upward.

5. An electric circuit control comprising supporting means provided with a vertical passage therethrough, circuit controlling means mounted on the supporting means, a rotatable shaft extending through said passage, and a movable member rigidly mounted on the upper end of the shaft for rotation thereby, said shaft being formed from a strip of sheet metal folded to provide spaced vertical side portions that extend through said passage in engagement with its side wall and that have integral extensions of greater width below said supporting means to form shoulders that prevent the shaft from moving upward, the lower ends of said extensions being integrally connected by a transverse portion.

6. An electric circuit control comprising a base member provided with a vertical opening therethrough, circuit controlling means mounted on the base member, a rotatable shaft extending through said opening, and a movable member rigidly mounted on the upper end of the shaft for rotation thereby, said shaft being formed from a strip of sheet metal folded to provide spaced vertical side portions that extend through said opening in engagement with its side wall and that have their lower ends integrally connected by a transverse portion that projects laterally from the opposite edges of the side portions below the lower surface of said base member to keep the shaft from moving upward, said transverse portion being provided with a slot adapted to receive a shaft-turning tool.

7. An electric circuit control comprising a base member provided with a vertical opening therethrough, circuit controlling means mounted on the base member, a bushing rigidly mounted in said opening and having a downwardly extending threaded portion, a rotatable shaft extending through the bushing, and a movable member rigidly mounted on the upper end of the shaft for rotation thereby, said shaft being formed from a strip of sheet metal folded to provide spaced vertical side portions that extend through the bushing in engagement with its inner surface and that have their lower ends integrally connected by a head portion projecting laterally from the opposite edges of the side portions to engage the lower end of the bushing.

8. An electric circuit control comprising a base member provided with a vertical opening therethrough, circuit controlling means mounted on the base member, a bushing rigidly mounted in said opening and having a downwardly extending threaded portion, a rotatable shaft extending through the bushing, and a movable member rigidly mounted on the upper end of the shaft for rotation thereby, said shaft being formed from a strip of sheet metal folded to provide spaced vertical side portions that extend through the bushing and are curved transversely to fit against its inner surface, said side portions having integral extensions of greater width below the bushing to form shoulders that engage the lower end of the bushing, and the lower ends of said extensions being integrally connected by a transverse portion.

MELAN MAX GECI, Jr.

No references cited.